(12) United States Patent
Jeong

(10) Patent No.: US 7,684,829 B2
(45) Date of Patent: Mar. 23, 2010

(54) INPUT APPARATUS OF A MOBILE TERMINAL AND A DISPLAY METHOD THEREOF

(75) Inventor: Ji-Myong Jeong, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 925 days.

(21) Appl. No.: 11/454,980

(22) Filed: Jun. 19, 2006

(65) Prior Publication Data
US 2007/0018961 A1    Jan. 25, 2007

(30) Foreign Application Priority Data
Jun. 20, 2005    (KR)    ............ 10-2005-0053199

(51) Int. Cl.
*H04M 1/00*    (2006.01)
*H04B 1/38*    (2006.01)
(52) U.S. Cl. ............ 455/566; 455/90.3; 455/575.1; 345/168; 345/169; 379/368; 379/433.06; 379/433.07
(58) Field of Classification Search ............... 455/90.3, 455/67.11, 566, 567, 575.1; 379/368, 433.06, 379/433.07; 345/168, 169, 170
See application file for complete search history.

(56) References Cited

U.S. PATENT DOCUMENTS

| | | | | |
|---|---|---|---|---|
| 5,539,400 A | * | 7/1996 | Mears | ............ 341/22 |
| 6,674,854 B1 | * | 1/2004 | Kawano et al. | ............ 379/368 |
| 2004/0198455 A1 | * | 10/2004 | Deeds | ............ 455/566 |

* cited by examiner

*Primary Examiner*—Nay A Maung
*Assistant Examiner*—Tuan H Nguyen
(74) *Attorney, Agent, or Firm*—Birch, Stewart, Kolasch & Birch, LLP

(57) ABSTRACT

An input apparatus of a mobile terminal and its display method are disclosed. The input apparatus of the mobile terminal according to an embodiment includes a keypad having a plurality of keys and generating key signals corresponding to a selection of the keys; a plurality of light emitting elements positioned at the plurality of keys, respectively, for illuminating the keys; a key sensor for sensing the key signals from the keypad; a storage unit for storing the key signals; and a controller for displaying, on the keypad, information corresponding to the key signals by selectively controlling the plurality of light emitting elements based on the key signals.

13 Claims, 5 Drawing Sheets

INPUT APPARATUS OF A MOBILE TERMINAL AND A DISPLAY METHOD THEREOF

This application claims priority to Korean Application No. 10-2005-0053199 filed in Korea on Jun. 20, 2005, the entire contents of which is incorporated by reference in its entirety.

BACKGROUND OF THE INVENTION

1. Field of the Invention

The present invention relates to a mobile terminal and, more particularly, to an input apparatus of a mobile terminal and its display method.

2. Description of the Related Art

In general, a keypad of a mobile terminal such as a mobile phone according to a related art includes a plurality of keys (buttons) for inputting particular information. A light emitting diode (LED) is formed at a lower portion of the keypad to allow a user to properly recognize the plurality of keys provided on the keypad.

FIG. 1 is a block diagram showing the construction of a keypad having an LED in a mobile terminal according to a related art.

As shown in FIG. 1, the keypad 1 of the related art mobile terminal includes a plurality of keys 2 for inputting a phone number or characters and light emitting elements (e.g., LEDs) 3 driven by power applied from outside and supplying light to the plurality of keys 2. One or more light emitting elements are installed in the keypad 1 to allow a user to input keys in the dark and supply light toward the keypad 1.

When the user selects keys (number button) 2 to input a phone number or characters in the dark, a controller (not shown) of the mobile terminal supplies power to the light emitting elements 3 based on signals of the selected keys. In this case, as the light emitting elements 3 emit light toward the keypad 1, the user can input a phone number or characters allocated to the keys in the dark.

However, the keypad of the related art mobile terminal has a problem or limitation in that when the user selects a particular key, light is simply emitted to the keypad, failing to provide diverse functions to the user.

SUMMARY OF THE INVENTION

One of the exemplary features of the present invention is to provide an input apparatus of a mobile terminal capable of providing particularly information without the necessity of a call connection by displaying diverse information such as characters or symbols on a keypad itself through a light emitting element installed at each key of the keypad of a mobile terminal, and to provide a display method thereof.

Another exemplary feature of the present invention is to provide an input apparatus of a mobile terminal capable of effectively providing information by performing a slide show function by storing information such as characters or symbols displayed on a keypad of a mobile terminal and continuously displaying the stored information on the keypad, and to provide its display method.

Still another exemplary feature of the present invention is to provide an input apparatus of a mobile terminal capable of giving fun to users by gradually completing information in displaying various information such as characters or symbols on a keypad, and to provide its display method.

To implement at least the above and other features in whole or in parts, the present invention provides an input apparatus of a mobile terminal including: a keypad having a plurality of keys; a plurality of light emitting elements positioned at the plurality of keys, respectively, and emitting light; a key sensor for sensing a key signal of the keypad; a storage unit for storing the key signal; and a controller for displaying information corresponding to the key signal on the keypad by independently controlling the plurality of light emitting elements based on the key signal sensed by the key sensing unit.

To implement at least the above and other features in whole or in parts, the present invention also provides a method for displaying input information of a mobile terminal including: displaying a plurality of pieces of information on a keypad by independently controlling each light emitting element installed at each key of the keypad of the mobile terminal; storing the plurality of pieces of information; and continuously displaying the plurality of stored information on the keypad.

To implement at least the above and other features in whole or in parts, the present invention also provides a method for displaying input information of a mobile terminal including: displaying a plurality of characters on a keypad of the mobile terminal by independently controlling each light emitting element installed at each key of the keypad; and continuously displaying the plurality of characters on the keypad.

According to an aspect, the present invention provides an input apparatus of a mobile terminal, the apparatus comprising: a keypad having a plurality of keys and generating key signals corresponding to a selection of the keys; a plurality of light emitting elements positioned at the plurality of keys, respectively, for illuminating the keys; a key sensor for sensing the key signals from the keypad; a storage unit for storing the key signals; and a controller for displaying, on the keypad, information corresponding to the key signals by selectively controlling the plurality of light emitting elements based on the key signals.

According to another aspect, the present invention provides a method for displaying information using a mobile terminal, the mobile terminal including a keypad having a plurality of keys, the method comprising: displaying information on the keypad of the mobile terminal by selectively illuminating the keys corresponding to the information.

According to another aspect, the present invention provides an input apparatus of a terminal, the apparatus comprising: a plurality of keys in a keypad; and a controller to selectively illuminate the keys so that all the illuminated keys as a whole are in a shape of a letter, a number, or a symbol.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Figure 1:
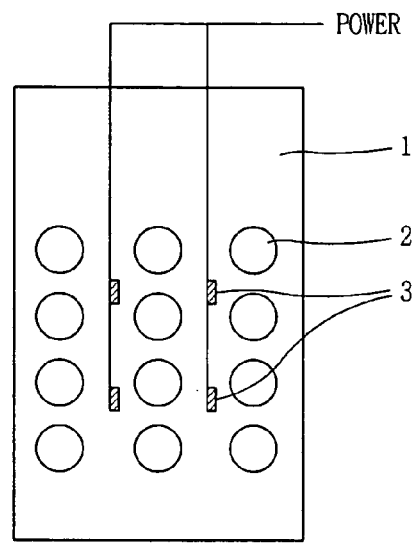
FIG. 1 is a block diagram showing the construction of a keypad having light emitting elements in a mobile terminal according to a related art.
Figure 2:
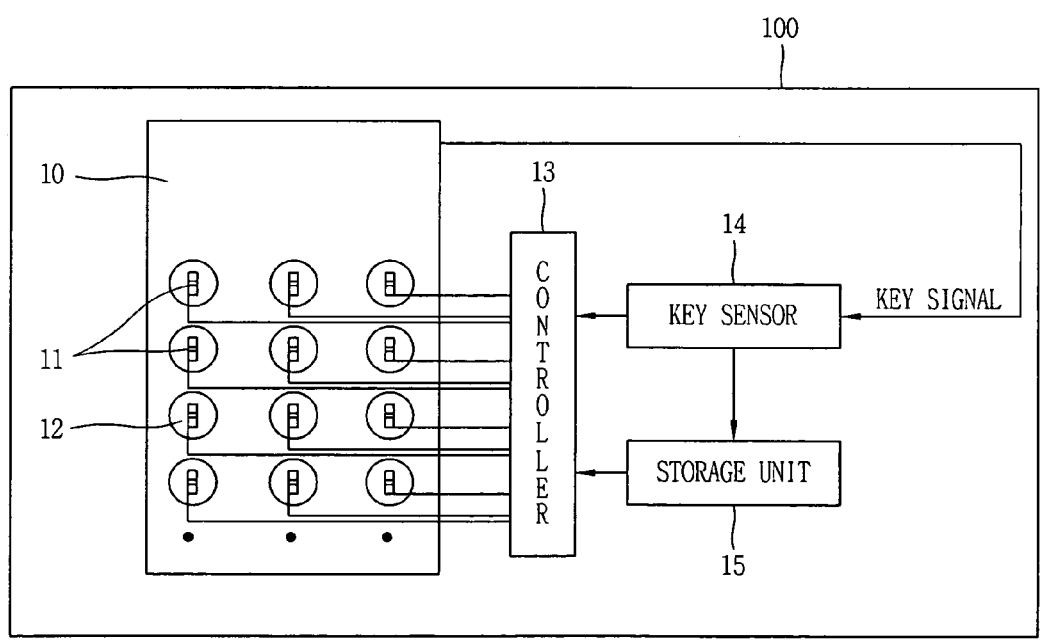
FIG. 2 is a block diagram showing the construction of an input apparatus of a mobile terminal according to an embodiment of the present invention.

FIG. 2 is a block diagram showing the construction of an input apparatus of a mobile terminal according to an embodiment of the present invention.

As shown in FIG. 2, the input apparatus of the mobile terminal 100 includes: a keypad 10 including a plurality of keys 12 for outputting key signals when a user inputs information such as characters, numbers, symbols, pattern, etc.; a plurality of light emitting elements 11 separately positioned at a lower portion of the plurality of keys 12 and emitting light towards the keys 12 to illuminate the keys 12 selectively; a key sensor 14 for sensing the key signals of the keypad 10; a storage unit 15 for storing the key signals obtained from the key sensor 14; and a controller 13 for displaying information corresponding to the key signals on the keypad 10 by independently controlling the plurality of light emitting elements 11 based on the key signals sensed by the key sensor 14. The keypad 10 can have a different number of keys in a variety of shapes and configurations. Herein, the light emitting element 11 installed at each key 12 is a 3-color LED (Light Emitting Diode) and emits various lights (e.g., red, blue and green), but can be other types.

The mobile terminal 100 also includes known components such as a display unit, a speaker, an antenna, etc. All the components of the mobile terminal including the input apparatus of the present invention are operatively configured and coupled.

When the mode of the mobile terminal 100 is changed to a slide show mode by a user, the controller 13 continuously displays information such as characters and symbols stored in the storage unit 15, automatically, on the keypad 10 itself. That is, the keys 12 in the keypad 10 are selectively lit by the light emitting elements 11 in the shape of a character, symbol, pattern, etc. to display the character, symbol, pattern, etc. In addition, when the information such as the characters and symbols stored in the storage unit 15 is displayed on the keypad 10 according to the user's request, the controller 13 can gradually complete the information, e.g., a character can be gradually displayed and completed on the keypad 10.

The operation of the input apparatus of the mobile terminal according to an embodiment of the present invention will now be described with reference to FIGS. 3A to 3C.

Figure 3A:
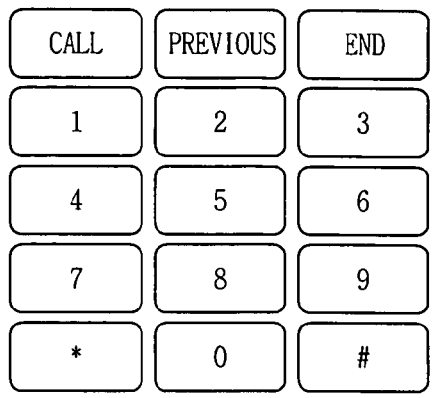
FIGS. 3A to 3C are examples of views showing a process of inputting characters through the input apparatus of the mobile terminal according to the present invention.
Figure 3B:
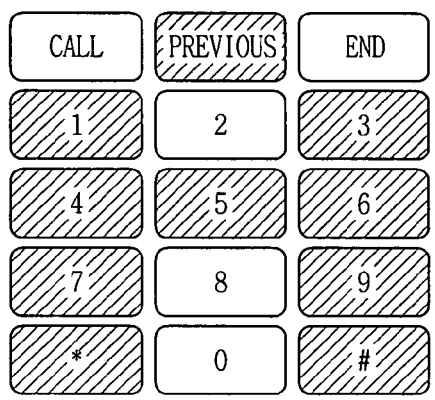
Figure 3C:
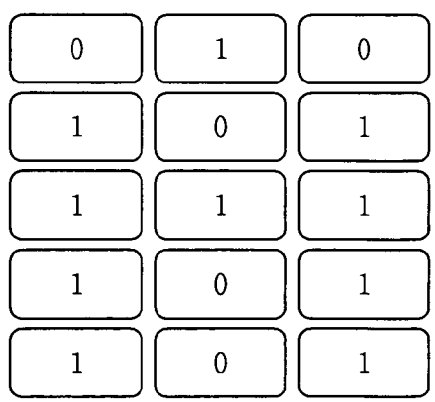

FIGS. 3A to 3C are examples of views showing a process of inputting characters through the input apparatus of the mobile terminal according to the present invention. This process is implemented by the input apparatus of FIG. 2, but can be implemented by other input devices.

As shown in FIG. 3A, when respective keys 12 (previous, 1, 4, 7, *, 3, 5, 6, 9, #) corresponding to a particularly character (e.g., a letter), for example, a character 'A', are selected by a user at the keypad 10, the corresponding key signals are outputted to the key sensor 14. The key sensor 14 outputs the key signals to the controller 13 in real time.

With reference to FIG. 3B, the controller operates the light emitting elements 11 installed at a lower portion of those keys 12 corresponding to each key signal outputted from the key sensor 14 in real time. For example, the controller 13 activates the keys selected by a user (e.g., by illuminating the keys) and deactivates (i.e., maintains at the non-activated state) keys that are not selected by the user. Accordingly, the character 'A' is displayed on the keypad 10 of the mobile terminal. For instance, as the user selects a particular key, the selected key is lit by the corresponding light emitting element so the user becomes aware of his selection.

Thereafter, after the keys 'previous, 1, 4, 7, *, 3, 5, 6, 9, #' are selected regardless of their order of selection to display the character 'A' on the keypad 10 itself, if no key is selected during a pre-set waiting time (e.g., 1~2 seconds), the key sensor 14 recognizes all the key signals corresponding to the character 'A' as one character and outputs the key signals corresponding to the character 'A' to the storage unit 15.

With reference to FIG. 3C, generally, the key sensor 14 recognizes signals of the keys selected by the user as '1', and signals of keys not selected by the user as '0'. Accordingly, for example, the key sensor 14 outputs the key signals (010101111101101) corresponding to the character 'A' to the storage unit 15, and the storage unit 15 stores the key signals (010101111101101) therein. As a variation, selected keys can have the '0' value, and the non-selected keys can have the '1' value.

Accordingly, when the user inputs various information (e.g., characters, numbers, symbols, logos, patterns, emoticons, etc.), the inputted information is stored as key signals in the storage unit 15.

Thereafter, when the user selects a slide show mode (e.g., using the menu on the screen of the mobile terminal) to continuously display the characters previously stored in the storage unit 15 on the keypad 10, the controller 15 sequentially, continuously and automatically displays the characters previously stored in the storage unit 15, performing the slide show of the stored information.

Meanwhile, when a character (e.g., 'A') stored in the storage unit 15 is displayed on the keypad 10 according to a user request, the controller 13 can gradually complete the character. That is, when the user sequentially activates the keys selected for completing the character 'A' according to the operation order, the keys corresponding to the character 'A' can be gradually and/or sequentially displayed on the keypad 10, e.g., in a certain order to provide eye-pleasing display effects.

As an example, the operation of the input apparatus of the mobile terminal 100 when the user selects a 'keypad display mode' and then select a 'slide show mode' to display characters 'LOVE' on the keypad 10 will be described in detail with reference to FIGS. 4 to 5D.

Figure 4:
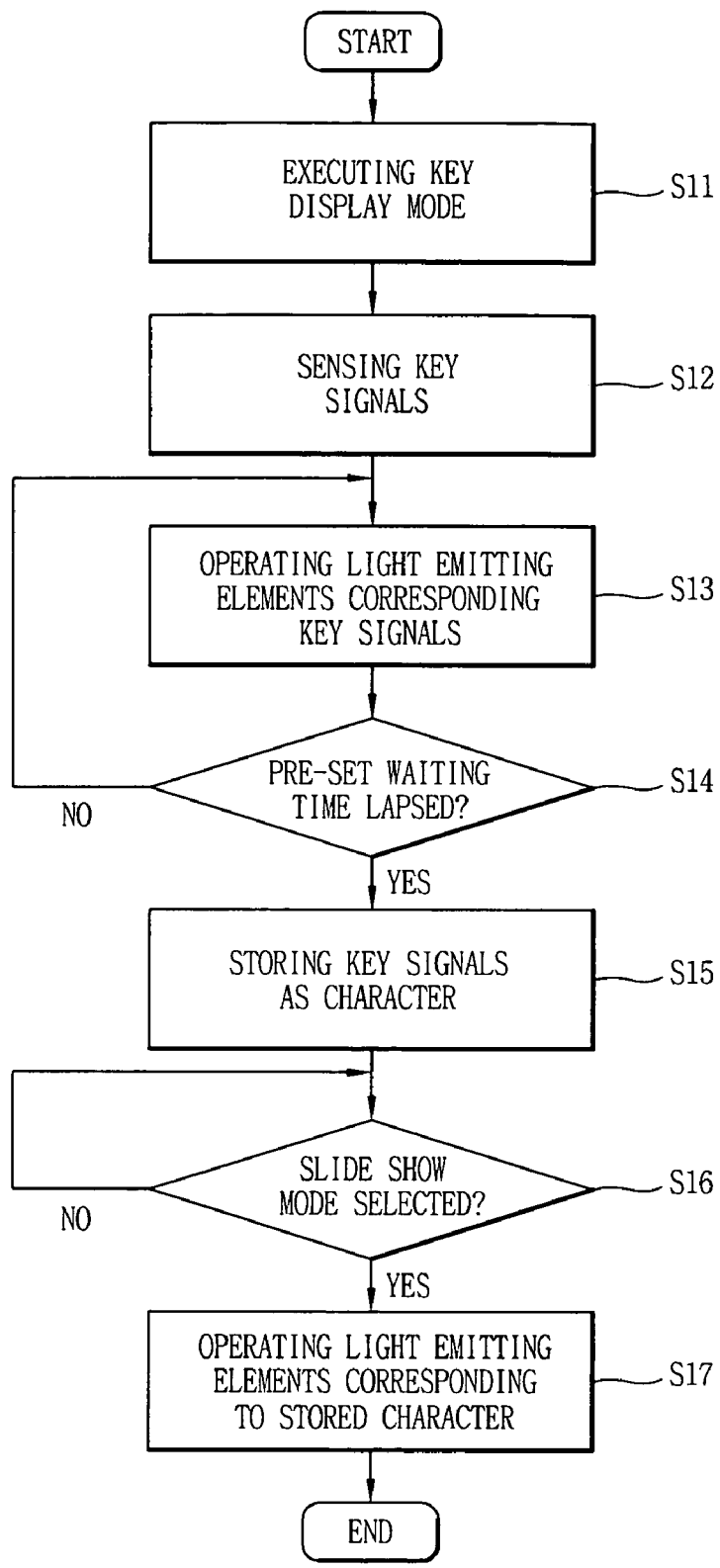
FIG. 4 is a flow chart illustrating an operation of the input apparatus of the mobile terminal according to the present invention.

FIG. 4 is a flow chart illustrating an operation of the input apparatus of the mobile terminal according to the present invention.

First, when the user executes a keypad display mode (step S11), e.g., using a menu on the screen of the mobile terminal and selects certain keys on the keypad 10, the key sensor 14 senses key signals of the selected keys outputted from the keypad 10 (step S12). For instance, if the user selects keys 'call, 1, 4, 7, *, 0, #' to display information such as the English alphabet 'L' on the keypad 10, the key sensor 14 sequentially outputs the key signals of the selected keys corresponding to the alphabet 'L' to the controller 13.

The controller 13 receives the respective key signals sequentially outputted from the key sensor 14, and operates the light emitting elements 11 corresponding to each received key signal. Herein, the key signals of the keys selected by the user are outputted to the controller 13 in real time, and the controller 13 operates and illuminates the corresponding light emitting elements according to the key signals in real time so the user can see immediately which key he has selected upon the selection. Accordingly, the character 'L' is gradually completed on the keypad 10 (step S13).

Figure 5A:
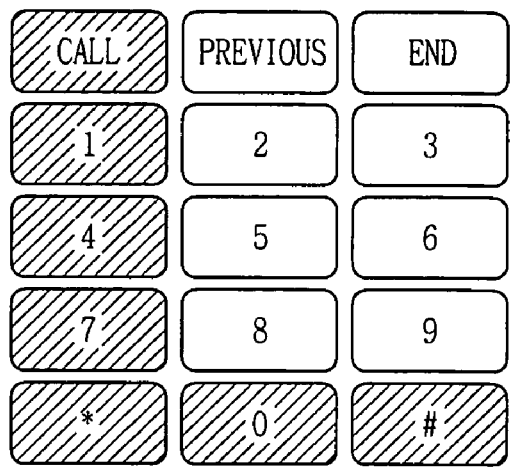
FIGS. 5A to 5D are examples of views showing a process of performing a slide show function through the input apparatus of the mobile terminal according to the present invention.

Thereafter, as shown in FIG. 5A, after all the keys 'call, 1, 4, 7, *, 0, #' are selected by the user and the information such as 'L' is displayed on the keypad 10 by the illuminated keys, if no other particular key is selected during a pre-set waiting time (e.g., 1~2 seconds) (step S14), the key sensor 14 recognizes the key signals corresponding to the character 'L' as one character and outputs the key signals corresponding to the character 'L' to the storage unit 15 for storage (step S15). In this case, the storage unit 15 stores the character 'L' as key signals. For examples, the key sensor 14 outputs data (100100100100111) of the key signals corresponding to the character 'L' to the storage unit 15. Then the user is notified that the character 'L' key signals have been stored, for instance, visually or audibly. For instance, once the storing is completed, all the illuminated keys would be simultaneously de-illuminated.

Figure 5B:
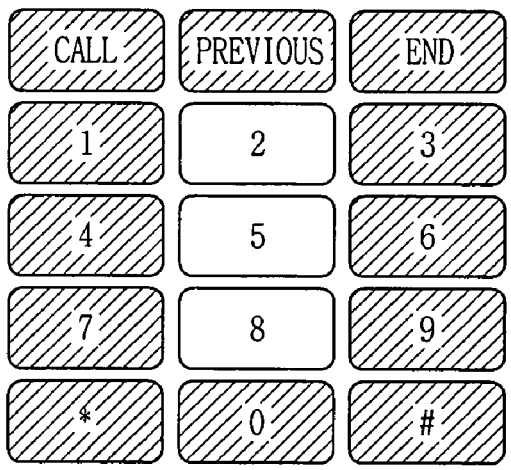

Then, with reference to FIG. 5B, keys 'call, 1, 4, 7, *, 0, #, 9, 6, 3, end, previous' are selected by the user and information such as the English alphabet 'O' is displayed on the keypad 10. If no other key is selected during the next pre-set waiting time (e.g., 1~2 seconds), the key sensor 14 recognizes the key signals corresponding to the character 'O' as one character and outputs the key signals corresponding to the character 'O' to the storage unit 15. In this case, the storage unit 15 stores the character 'O' as the key signals. For example, the key sensor 14 outputs data (111101101101111) of the key signals corresponding to the character 'O' to the storage unit 15. Then the user is notified that the character 'O' signals have been stored.

Figure 5C:
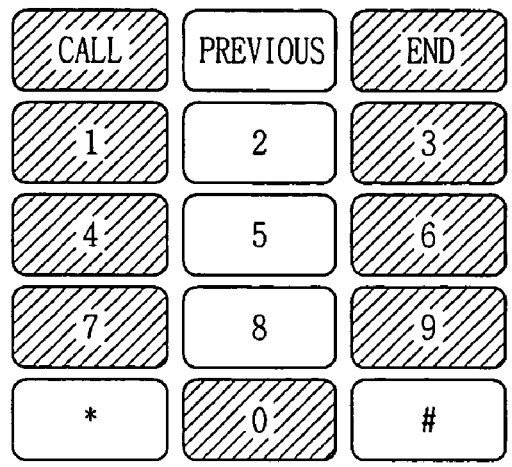

Then, with reference to FIG. 5C, keys 'call, 1, 4, 7, 0, 9, 6, 3, end' are selected by the user and information such as the English alphabet 'V' is displayed on the keypad 10. If a key is not selected during the next pre-set waiting time (e.g., 1~2 seconds), the key sensor 14 recognizes the key signals corresponding to the character 'V' as one character and outputs the key signals corresponding to the character 'V' to the storage unit 15. In this case, the storage unit 15 stores the character 'V' as the key signals. For example, the key sensor 14 outputs data (101101101101010) of the key signals corresponding to the character 'V' to the storage unit 15. Then the user is notified that the character 'V' signals have been stored.

Figure 5D:
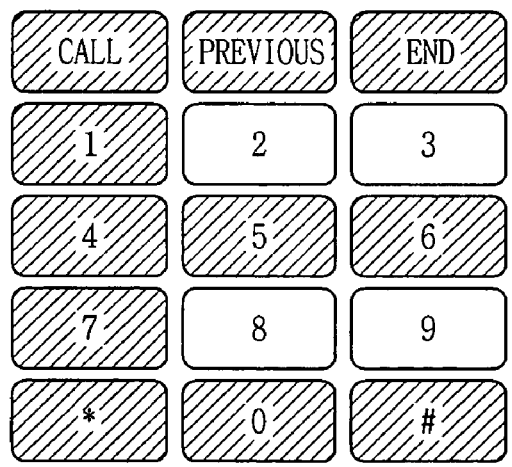

Then, with reference to FIG. 5D, keys 'call, previous, end, 1, 4, 7, *, 0, #, 5, 6' are selected by the user and information such as the English alphabet 'E' is displayed on the keypad 10. If a key is not selected during the next pre-set waiting time (e.g., 1~2 seconds), the key sensor 14 recognizes the key signals corresponding to the character 'E' as one character and outputs the key signals corresponding to the character 'E' to the storage unit 15. In this case, the storage unit 15 stores the character 'E' as the key signals. For example, the key sensor 14 outputs data (111100111100111) of the key signals corresponding to the character 'D' to the storage unit 15. Then the user is notified that the character 'D' signals are stored.

Thereafter, if the user selects the 'slide show mode' to sequentially and continuously display the stored characters 'L', 'O', 'V' and 'E' on the keypad 10 (step S16), the controller 13 operates the light emitting elements corresponding to the character 'L' according to the key signals corresponding to the character 'L' stored in the storage unit 15 during a pre-set display time (e.g., 1~2 seconds) (step S17). For example, the controller 13 reads data (100100100100111) of the key signals corresponding to the character 'L' stored in the storage unit 15 and operates the light emitting elements 11 installed at each key corresponding to the read data, thereby displaying the character 'L' on the keypad 10. Herein, the keys recognized as '1' are activated (e.g., illuminated) while the keys recognized as '0' are deactivated or not activated (e.g., not illuminated).

After the character 'L' is displayed, when the pre-set display time (e.g., 1~2 seconds) lapses, the controller 13 operates the light emitting elements corresponding to the character 'O' according to the key signals corresponding to the character 'O' stored in the storage unit 15 during the pre-set display time. For example, the controller 13 reads data (111101101101111) of the key signals corresponding to the character 'O' stored in the storage unit 15 and operates the light emitting elements 11 installed at each key corresponding to the read data, thereby displaying the character 'O' on the keypad 10.

After the character 'O' is displayed, when the pre-set display time (e.g., 1~2 seconds) lapses, the controller 13 operates the light emitting elements corresponding to the character 'V' according to the key signals corresponding to the character 'V' stored in the storage unit 15 during the pre-set display time. For example, the controller 13 reads data (101101101101010) of the key signals corresponding to the character 'V' stored in the storage unit 15 and operates the light emitting elements 11 installed at each key corresponding to the read data, thereby displaying the character 'V' on the keypad 10.

After the character 'V' is displayed, when the pre-set display time (e.g., 1~2 seconds) lapses, the controller 13 operates the light emitting elements corresponding to the character 'O' according to the key signals corresponding to the character 'O' stored in the storage unit 15 during the pre-set display time. For example, the controller 13 reads data (111101101101111) of the key signals corresponding to the character 'O' stored in the storage unit 15 and operates the light emitting elements 11 installed at each key corresponding to the read data, thereby displaying the character 'O' on the keypad 10.

After the character 'O' is displayed, when the pre-set display time (e.g., 1~2 seconds) lapses, the controller 13 operates the light emitting elements corresponding to the character 'E' according to the key signals corresponding to the character 'E' stored in the storage unit 15 during the pre-set display time. For example, the controller 13 reads data (111100111100111) of the key signals corresponding to the character 'E' stored in the storage unit 15 and operates the light emitting elements 11 installed at each key corresponding to the read data, thereby displaying the character 'E' on the keypad 10.

Accordingly, the user who uses the input apparatus of the mobile terminal can show the characters 'LOVE' on the keypad in a slide show type to a particular person from a remote distance. Also, when the characters (or other information) stored in the storage unit are displayed on the keypad 10, the input apparatus of the mobile terminal can gradually complete each of the characters.

For example, when the character 'L' stored in the storage unit 15 is displayed on the keypad 10, the controller 13 can sequentially operate a light emitting element corresponding to a call key, a light emitting element corresponding to a No. 1 key, a light emitting element corresponding to a No. 4 key, a light emitting element corresponding to a No. 7 key, a light emitting element corresponding to a * key, a light emitting element corresponding to a No. 0 key, and then, a light emitting element corresponding to a # key. Accordingly, the character 'L' can gradually appear and be displayed on the keypad 10. Namely, when the character 'L' is displayed on the keypad, the controller 13 sequentially reads data (100100100100111) of the key signals corresponding to the character 'L' one by one at every pre-set time interval from the storage unit 15, and operates the light emitting elements installed at the keys corresponding to the read data to thereby gradually complete the character 'L'.

According to the present invention, various colors can be displayed on the keypad 10. For example, the character 'L' can be displayed in a red color by using the three-color light emitting element, the character 'O' can be displayed in a blue color, the character 'V' can be displayed in a green color, and the character 'E' can be displayed in the red color. Also, the characters (or other information) can be displayed in different display styles. For example, all the keys 11 forming the shape of the character 'L' can be illuminated for a certain time duration and then flash for several times. Further, the user can select any key pattern of the keys 11 to display that selected pattern.

In another embodiment of the present invention, instead of a user manually selecting the keys 11 forming a desired pattern or shape to store the key signals in the storage unit 15, appropriate key signals for different characters, symbols, etc. can be pre-stored in the storage unit 15 without the user's entry. For example, a set of key signals for each of all the letters in the alphabet and numbers 0-9 can be determined by the manufacturer of the mobile terminal and prestored in the mobile terminal. So if the user desires the word 'LOVE' to be displayed on the key pad 10, then the user can enter or type the word "LOVE" using the conventional data entry technique (e.g., using the display screen) into the mobile terminal, and instruct a key pad display of the word (e.g., using a menu). Then the controller can access the key signals pre-stored in associated with the letters L,O,V,E and display them on the key pad 10 by illuminating the appropriate keys. Thus the same effect of having the key pad display can be obtained without the manual entry of all the keys associated each letter by the user.

As so far described, the input apparatus of the mobile terminal and its display method according to the present invention have many advantages.

For instance, by displaying various information such as characters and symbols on the keypad through the light emitting elements of the keypad of the mobile terminal, particular information can be provided without the necessity of a call connection.

In addition, various information such as characters and symbols displayed on the keypad of the mobile terminal can be stored and then continuously displayed on the keypad to perform the slide show function, whereby information can be effectively provided.

Moreover, when various information such as characters, symbols, etc. is displayed on the keypad, the information can be gradually completed to provide enhanced visual effect to users.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. An input apparatus of a mobile terminal, the apparatus comprising:
   a keypad having a plurality of keys and configured to generate key signals corresponding to a selection of the keys;
   a plurality of light emitting elements relating to the plurality of keys, respectively, configured to illuminate the keys;
   a key sensor configured to sense the key signals from the keypad;
   a storage unit configure to store the key signals; and
   a controller configured to display, on the keypad, information corresponding to the key signals by selectively controlling the plurality of light emitting elements based on the key signals,
   wherein the storage unit is configured to store therein different sets of lighting pattern information, each set corresponding to a piece of the information, and the controller is configured to illuminate the light emitting elements corresponding to each set of the lighting pattern information, and
   wherein for each piece of the information, when a user selects a plurality of light emitting elements by using the plurality of keys corresponding to a particular piece of the information, and thereafter, if no key selection is made during a preset time duration, then the controller is configured to store into the storage unit the key signals corresponding to the selected plurality of keys corresponding to the particular piece of the information,
   and wherein the controller is configured to sequentially illuminate each of the keys corresponding to the key signals, so that the information gradually appears on the keypad.

2. The apparatus of claim 1, wherein the information is a character, a word, a number, a symbol, a pattern, or an emoticon.

3. The apparatus of claim 1, wherein the controller is configured to sequentially display the pieces of the information on the keypad in different colors.

4. The apparatus of claim 1, wherein the controller is configured to display the pieces of the information on the keypad in a form of a word or a message.

5. The apparatus of claim 1, wherein the controller is configured to perform a slide show of the information on the keypad by selectively illuminating the keys.

6. The apparatus of claim 1, wherein the light emitting elements are configured to emit various colors.

7. A method for displaying information using a mobile terminal, the mobile terminal including a keypad having a plurality of keys, the method comprising:
   displaying information on the keypad of the mobile terminal by selectively illuminating the keys corresponding to the information, wherein the step of displaying includes
   receiving a user's selections of the keys corresponding to the information;
   storing, in a storage unit of the mobile terminal, key signals corresponding to the selected keys; and
   illuminating the keys according to the key signals to display the information on the keypad,
   wherein the storing step includes storing in the storage unit different sets of key signals, each set corresponding to a piece of the information, and the illuminating step includes illuminating tile light emitting elements corresponding to each set of the key signals, and
   wherein for each piece of the information, in the receiving step, when the user selects a plurality of keys corresponding to a particular piece of the information, and thereafter if no key selection is made during a preset time duration, then the storing step includes storing the key signals corresponding to the selected plurality of keys corresponding to the particular piece of the information in the storage unit, and wherein the displaying step includes sequentially illuminating each of the keys corresponding to the information, so that the information gradually appears on the keypad.

8. The method of claim 7, further comprising:

visually or audibly notifying the user of a completion of the storing in the storage unit, each time the key signals corresponding to each piece of the information is stored in the storage unit.

9. The method of claim 7, wherein the pieces of the information are displayed sequentially on the keypad in different colors.

10. The method of claim 7, wherein the pieces of the information as displayed on the keypad form a word or a message.

11. The method of claim 7, wherein the displaying step includes displaying the information on the keypad in a slide show by selectively illuminating the keys.

12. The method of claim 7, wherein the information is a character, a word, a number, a symbol, a pattern, or an emoticon.

13. The method of claim 7, wherein the displaying step includes:

prestoring different sets of key signals in the mobile terminal, each set of key signals corresponding to a letter, a number, a symbol, or a pattern;

receiving a user's input of the information to be displayed; and illuminating the keys corresponding to the user's input information based on the prestored sets of key signals, so as to display the information on the keypad.

* * * * *